(12) United States Patent
Trabelsi et al.

(10) Patent No.: US 10,360,271 B2
(45) Date of Patent: Jul. 23, 2019

(54) MINING SECURITY VULNERABILITIES AVAILABLE FROM SOCIAL MEDIA

(71) Applicants: Slim Trabelsi, Nice (FR); Henrik Plate, Valbonne (DE); Gilles Montagnon, Mougins (FR); Elton Mathias, Nice (FR)

(72) Inventors: Slim Trabelsi, Nice (FR); Henrik Plate, Valbonne (DE); Gilles Montagnon, Mougins (FR); Elton Mathias, Nice (FR)

(73) Assignee: SAP SE, Walldorf (DE)

( * ) Notice: Subject to any disclaimer, the term of this patent is extended or adjusted under 35 U.S.C. 154(b) by 1012 days.

(21) Appl. No.: 14/189,670

(22) Filed: Feb. 25, 2014

(65) Prior Publication Data
US 2015/0242515 A1 Aug. 27, 2015

(51) Int. Cl.
*G06F 16/9535* (2019.01)

(52) U.S. Cl.
CPC ................ *G06F 16/9535* (2019.01)

(58) Field of Classification Search
CPC ......... G06F 17/30867; G06F 17/30864; G06F 17/30625; G06F 17/30684; G06F 16/951; G06F 16/9535; G06F 16/322; G06F 16/3344; G06F 16/367; G06F 16/9032; G06F 16/90344
USPC ................................................. 707/706, 713
See application file for complete search history.

(56) References Cited

U.S. PATENT DOCUMENTS

| | | |
|---|---|---|
| 7,200,720 B1 | 4/2007 | Yang et al. |
| 7,240,067 B2 | 7/2007 | Timmons |
| 7,711,750 B1 * | 5/2010 | Dutta .................. G06F 21/6227 707/784 |
| 7,774,459 B2 | 8/2010 | Wang et al. |
| 8,046,348 B1 | 10/2011 | Rehling et al. |
| 8,302,197 B2 | 10/2012 | Huang et al. |

(Continued)

OTHER PUBLICATIONS

ThreatSecure.com at http://www.threattracksecurity.com/enterprise-security/advanced-persistent-threat.aspx (as of Jul. 17, 2015).
(Continued)

*Primary Examiner* — James Trujillo
*Assistant Examiner* — Fariborz Khoshnoodi
(74) *Attorney, Agent, or Firm* — Fountainhead Law Group P.C.

(57) ABSTRACT

Embodiments provide systems and methods configured to mine information available from informal sources (e.g., social media, blogs, and forums) regarding security vulnerabilities. Particular embodiments may comprise engine(s) of a backend in communication with a user through an interface of a frontend, and also in communication with an underlying database to store security information and related information (e.g. search parameters). Embodiments may allow creation of user-specific search phrases for searching information in one or more informal social media information sources. Search results may be consolidated, and users such as system administrators quickly alerted to possible security issues. Embodiments may refine data mining over time by tracking the reputation (e.g. for data accuracy, freshness) of various sources. Embodiments may also reference formal official and third party sources of security information.

14 Claims, 9 Drawing Sheets

(56) References Cited

U.S. PATENT DOCUMENTS

| | | | |
|---|---|---|---|
| 8,468,244 B2 | 6/2013 | Redlich et al. | |
| 8,484,228 B2 | 7/2013 | Bhattacharyya et al. | |
| 8,572,740 B2 | 10/2013 | Mashevsky et al. | |
| 8,725,495 B2 | 5/2014 | Peng et al. | |
| 8,739,288 B2 | 5/2014 | Diamant et al. | |
| 8,763,132 B2 | 6/2014 | Shanley | |
| 8,788,260 B2 | 7/2014 | Nygaard et al. | |
| 9,122,989 B1* | 9/2015 | Morris | G06Q 30/02 |
| 9,158,915 B1 | 10/2015 | Yumer et al. | |
| 9,172,608 B2* | 10/2015 | Zeyliger | G06F 9/44505 |
| 9,361,337 B1* | 6/2016 | Bhave | G06F 11/3476 |
| 2003/0009696 A1 | 1/2003 | Bunker V. et al. | |
| 2003/0120949 A1 | 6/2003 | Redlich et al. | |
| 2004/0010502 A1* | 1/2004 | Bomfim | G06F 17/30371 |
| 2006/0104520 A1* | 5/2006 | Kraus | G06F 16/58 382/225 |
| 2007/0169199 A1 | 7/2007 | Quinnell et al. | |
| 2007/0233782 A1* | 10/2007 | Tali | G06F 8/61 709/203 |
| 2008/0065646 A1 | 3/2008 | Zhang et al. | |
| 2009/0164449 A1* | 6/2009 | Huang | G06F 17/30864 |
| 2011/0173193 A1* | 7/2011 | Ahn | G06F 17/30398 707/725 |
| 2012/0191594 A1* | 7/2012 | Welch | G06Q 40/02 705/38 |
| 2012/0304244 A1 | 11/2012 | Xie et al. | |
| 2013/0124545 A1 | 5/2013 | Holmberg et al. | |
| 2014/0020065 A1* | 1/2014 | Motgi | H04L 63/10 726/4 |
| 2014/0059203 A1 | 2/2014 | Trabelsi et al. | |
| 2014/0089038 A1 | 3/2014 | Bagheri et al. | |

OTHER PUBLICATIONS

Md Tanvir Arafin and Richard Royster—Internet Article entitled "Vulnerability Exploits Advertised on Twitter" retrieved on Jul. 21, 2015 from http://www.umiacs.umd.edu/~tdumitra/courses/ENEE759D/Fall13/project_reports/twitter.pdf.

Adrian Kingsley-Hughses, Internet Article entitled "Secunia PSI—This One Free Download Will Make Your PC Dramatically Safer," Apr. 12, 2012. Retrieved from: forbes.com/sites/adriankingsleyhughes/2012/04/12/secunia-psi-this-one-free-download-will-make0your-pc-dramatically-safer/.

Internet Article entitled "Security Database—before it comes upon you," retrieved on Jan. 21, 2014 from: www. security-database.com.

Internet Article entitled "NetBase Social Media Management (SMMS): Designed for Business Impact," retrieved on Jan. 21, 2014 from www.netbase.com/social-media-management.

Internet Article entitled "Improve your security, prioritize resources, cut time and costs, and stay ahead of the latest threats through VUPEN solutions," retrieved on Jan. 21, 2014, from VUPEN security.

Varish Mulwad, "Extracting Information about Security Vulnerabilities from Web Text", Proceedings of the Web Intelligence for Information Security Workshop, Aug. 2011, 4 pages.

Slim Trabelsi et al, "Mining Social Networks for Software Vulnerabilities Monitoring", IEEE, 2015, 7 pages.

Slim Trabelsi et al, "Monitoring Software Vulnerabilities through Social Networks Analysis", 2015 12th International Joint Conference on e-Business and Telecommunications, Jul. 20-22, 2015, 7 pages.

Carl Sabottke et al, "Vulnerability Disclosure in the Age of Social Media: Exploiting Twitter for Predicting Real-Norld Exploits", SEC'15 Proceedings of the 24th USENIX Conference on Security Symposium, Aug. 12-14, 2015, 17 pages.

Md Tanvir Arafin et al, "Vulnerability Exploits Advertised on Twitter", retrieved 2013, 8 pages.

* cited by examiner

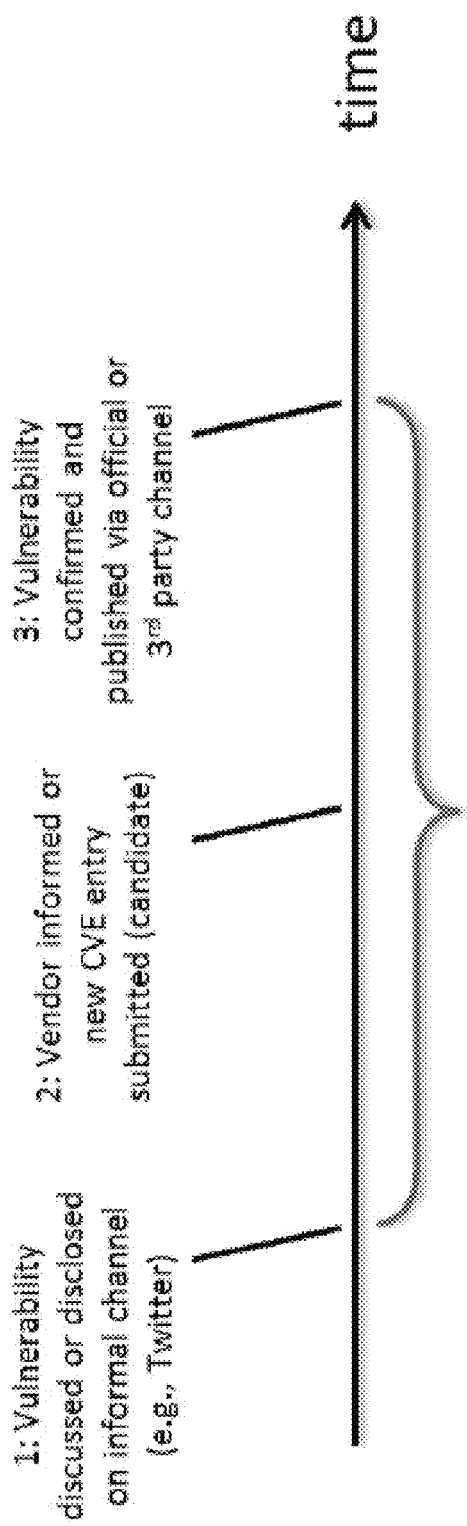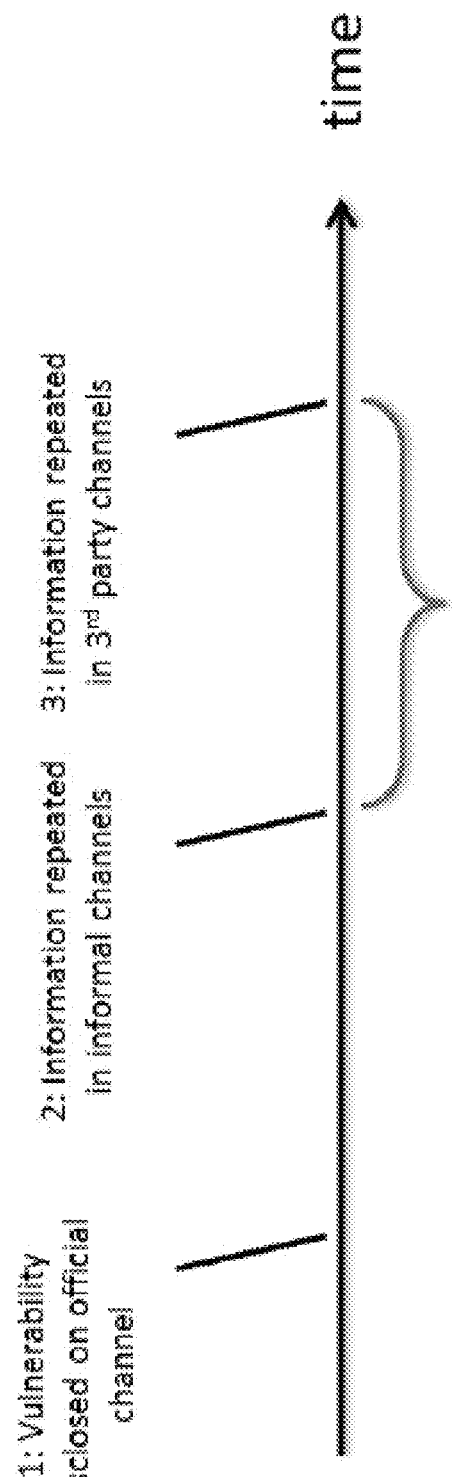

MINING SECURITY VULNERABILITIES AVAILABLE FROM SOCIAL MEDIA

BACKGROUND

Embodiments of the present invention relate to computer security, and in particular, to systems and methods configured to mine security vulnerability disclosures that are available from social media.

Unless otherwise indicated herein, the approaches described in this section are not prior art to the claims in this application and are not admitted to be prior art by inclusion in this section.

Software users desire to stay informed about security information relevant for their information technology (IT) systems. Such security information supports users in understanding security risks arising from security vulnerabilities, and helps them in protecting their systems.

Security information, however, may typically be communicated through a variety of different channels. Each such channel may offer information of different scope, quality, and/or freshness (e.g. up-to-dateness).

For example under certain circumstances a software security vulnerability and zero-day exploit may published by the software owner once a hacker detects and reports that vulnerability. In some cases, however, vulnerabilities are not reported directly to the software owner or to a security instance, but are instead simply published in the internet as a trophy. Sometimes, a corresponding delay between first publication of the exploit first publication and the official announcement of the vulnerability can open the floor to other attackers to take advantage of the vulnerability.

Accordingly, the present disclosure addresses these and other issues with systems and methods that are configured to mine security vulnerabilities available from social media.

SUMMARY

Embodiments provide systems and methods configured to mine information available from informal sources (e.g., social media, blogs, and forums) regarding security vulnerabilities. Particular embodiments may comprise engine(s) of a backend in communication with a user through an interface of a frontend, and also in communication with an underlying database to store security information and related information (e.g. search parameters). Embodiments may allow creation of user-specific search phrases for searching information in one or more informal social media information sources. Search results may be consolidated, and users such as system administrators quickly alerted to possible security issues. Alerts can also concern vulnerability exploitation, or patch information. Embodiments may refine data mining over time by tracking the reputation (e.g. for data accuracy, freshness) of various sources. Embodiments may also reference formal official and third party sources of security information.

A computer-implemented method according to an embodiment comprises, causing an engine to store in a database, a list of system components. The engine creates and stores in the database, a first security search phrase for each system component. The engine searches content in a social media information source with the first security search phrase to collect a first search result. The engine stores the first search result in the database with corresponding first meta-data. The engine performs an analysis of the first search result. Based upon the analysis, the engine provides the first search result to a user.

An embodiment of a non-transitory computer readable storage medium embodies a computer program for performing a method comprising causing an engine to store in a database, a list of system components, and causing the engine to create and store in the database, a first security search phrase for each system component. The engine is caused to search content in a social media information source with the first security search phrase to collect a first search result. The engine is caused to store the first search result in the database with corresponding first meta-data. The engine performs an analysis of the first search result, and based upon the analysis the engine provides the first search result to a user.

An embodiment of a computer system comprises one or more processors and a software program executable on said computer system. The software program is configured to cause an engine to store in a database, a list of system components, and to cause the engine to create and store in the database, a first security search phrase for each system component. The engine is caused to search content in a social media information source with the first security search phrase to collect a first search result. The engine is caused to store the first search result in the database with corresponding first meta-data. The engine performs an analysis of the first search result. Based upon the analysis, the engine is caused to provide the first search result to a user.

In some embodiments the analysis comprises analyzing the first meta-data to compute a metric enriching the first search result.

According to certain embodiments the analysis comprises validating the first search result.

Particular embodiments may further comprise causing the engine to compute a reputation of the social media information source.

Various embodiments may further comprise causing the engine to search content in a formal security information source with the first security search phrase to collect a second search result. The engine may store the second search result in the database with corresponding second meta-data. The engine may analyze the second search result, and based upon the analysis, may cause the engine to provide the second search result to the user.

An embodiment may further comprise causing the engine to create an updated list of system components, and causing the engine to create and store in the database, a second security search phrase for a new component of the updated list. The engine may be caused to search content in a social media information source with the second security search phrase to collect a second search result. The engine may be caused to store the second search result in the database with corresponding second meta-data. The engine may analyze the second search result, and based upon the analysis the engine may provide the second search result to the user.

In particular embodiments the list of system components includes a software library, and the first security search phrase relates to the software library.

The following detailed description and accompanying drawings provide a better understanding of the nature and advantages of particular embodiments.

BRIEF DESCRIPTION OF THE DRAWINGS

FIGS. 2 and 3 show simplified timelines illustrating events indicating the existence of a security vulnerability.

DETAILED DESCRIPTION

Figure 1:
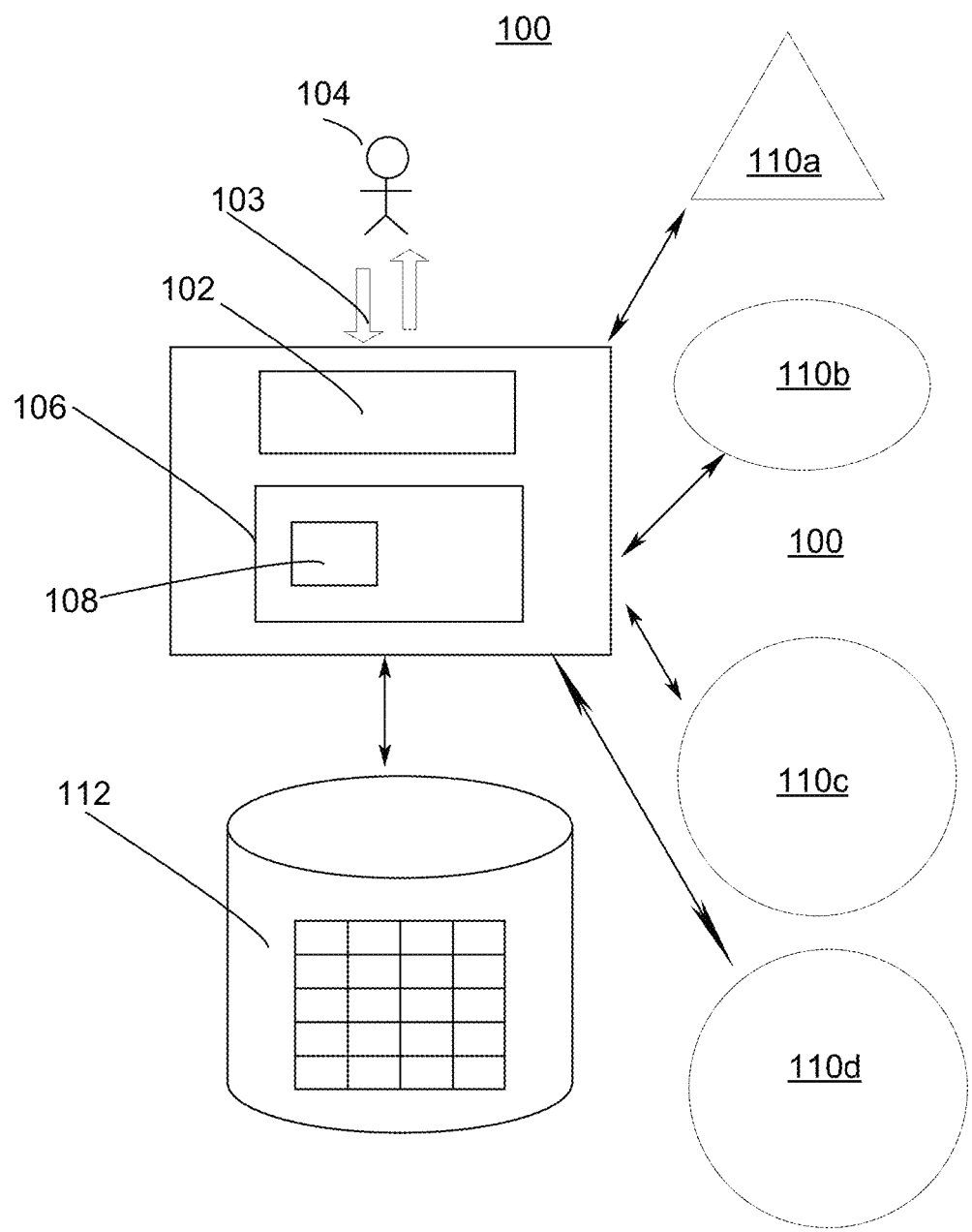
FIG. 1 shows a simplified view of a data mining system according to an embodiment.

Described herein are techniques for systems and methods that are configured to mine security vulnerabilities available from social media. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Secure operation of IT systems may result in software end-users learning about security information relevant for software they have installed. As used herein, security information can refer to the disclosure of a new vulnerability, the availability of an exploit, and/or the provision of a patch from a software vendor.

End-users can learn about security information through different channels. One example of such a channel is a vendor's public website. Another example of a channel is a community site. For general purposes, at least the following three different channel types may be recognized.

A first channel type comprises an official channel. Such an official channel is used by software vendors to report security information related to their software (e.g., vulnerabilities, corresponding patches or work-arounds.) Some vendors may inform customers proactively, for example by direct email communication.

A second channel type comprises commercial third party channels. Such channels may be used by non-profit or commercial organizations to provide centralized access to security information affecting software from many different vendors. This may facilitate the work of system administrators, who then may not need to consider each vendor's official channel.

Some commercial third party channels report vulnerabilities even before the affected software vendor provided a patch or work-around. One example is VUPEN Security available from Vupen Security S.A. of Montpellier, France.

Other commercial third party channels may provide central access to information collected from official channels and/or other third party channels. An example is the services available from Security-Database.com.

Still other commercial third party channels may serve as public repositories of security information. One example is the National Vulnerability Database (NVD), which is a public repository of common vulnerabilities and exposures (CVE) vulnerabilities available from the National Institute of Standards and Technology (NIST).

A third channel type comprises common informal channels. Such informal channels may be used by security professionals, hackers, or hacking communities in order to share security information quickly and informally and by means of social media (e.g. blogs, forums, or TWITTER).

In these informal channels, information stemming from the above sources is sometimes simply repeated. On other occasions, however, original information about new vulnerabilities, exploits, and/or workarounds may be provided.

Informal security information channel types may differ in terms of one or more characteristics. One is dimensionality. This can refer to the scope of information (in terms of kinds of security information), vendor scope (one vendor/product or vendor-independent), quality (reliability or accuracy of information), or up-to-dateness/freshness (how much time passed between the moment when the information was first available, if at all, and when it was published through the respective channel).

Apart from such content-related dimensions, the consumption of various security information channel types may incur certain costs at end-user side. Those stem from license or subscriptions fees (in case of commercial offerings such as VUPEN), or from the manual processing required to understand the relevance of given information (with regard to the software components and versions in use at end-user side).

While large entities may have significant security budgets, other organization may not be able to cover all security information channels, but instead likely focus on official and third party channels. Informal channels may be particularly difficult to be searched and tracked due to their unstructured, distributed, and redundant character.

However, relying only upon official and third party channels can result in (increased) windows of opportunity for attackers to exploit vulnerabilities. These windows could be specific for each user, depending on the channel actually used).

Accordingly, embodiments provide systems and methods configured to mine information available from informal sources (e.g., social media, blogs, and forums) regarding security vulnerabilities. Particular embodiments may comprise engine(s) of a backend in communication with a user through an interface of a frontend, and also in communication with an underlying database to store security information and related information (e.g. search parameters). Embodiments may allow creation of user-specific search phrases for searching information in one or more informal social media information sources. Search results may be consolidated, and users such as system administrators quickly alerted to possible security issues. Embodiments may refine data mining over time by tracking the reputation (e.g. for data accuracy, freshness) of various sources. Embodiments may also reference formal official and third party sources of security information.

FIG. 1 shows a simplified view of a data mining system according to an embodiment. System 100 comprises a frontend 102 including interface(s) allowing the user 104 to communicate inputs 103 (e.g. search terms) to a backend 106 including an engine 108.

The engine is configured to communicate (e.g. via the internet) with outside information sources 110 relating to security. For example, one information source may be an official source 110a. Another information source may be a third party source 110b. Still other information sources 110c, 110d may be informal in nature, as has been described.

The engine is also in communication with a database 112. This database may be configured to store security information received from various sources, as well as search parameters and other compiled data having relevance to security.

It is noted that the database is not limited to being in any particular form or implementation. The database could comprise a conventional disk-based database.

Alternatively, the database could comprise an in-memory database. One example of such an in-memory database is the HANA database available from SAP AG. Other examples can include but are not limited to the SYBASE IQ database also available from SAP AG; the Microsoft Embedded SQL for C (ESQL/C) database available from Microsoft Corp. of Redmond, Wash.; and the Exalytics In-Memory database available from Oracle Corp. of Redwood Shores, Calif.

Figure 4:
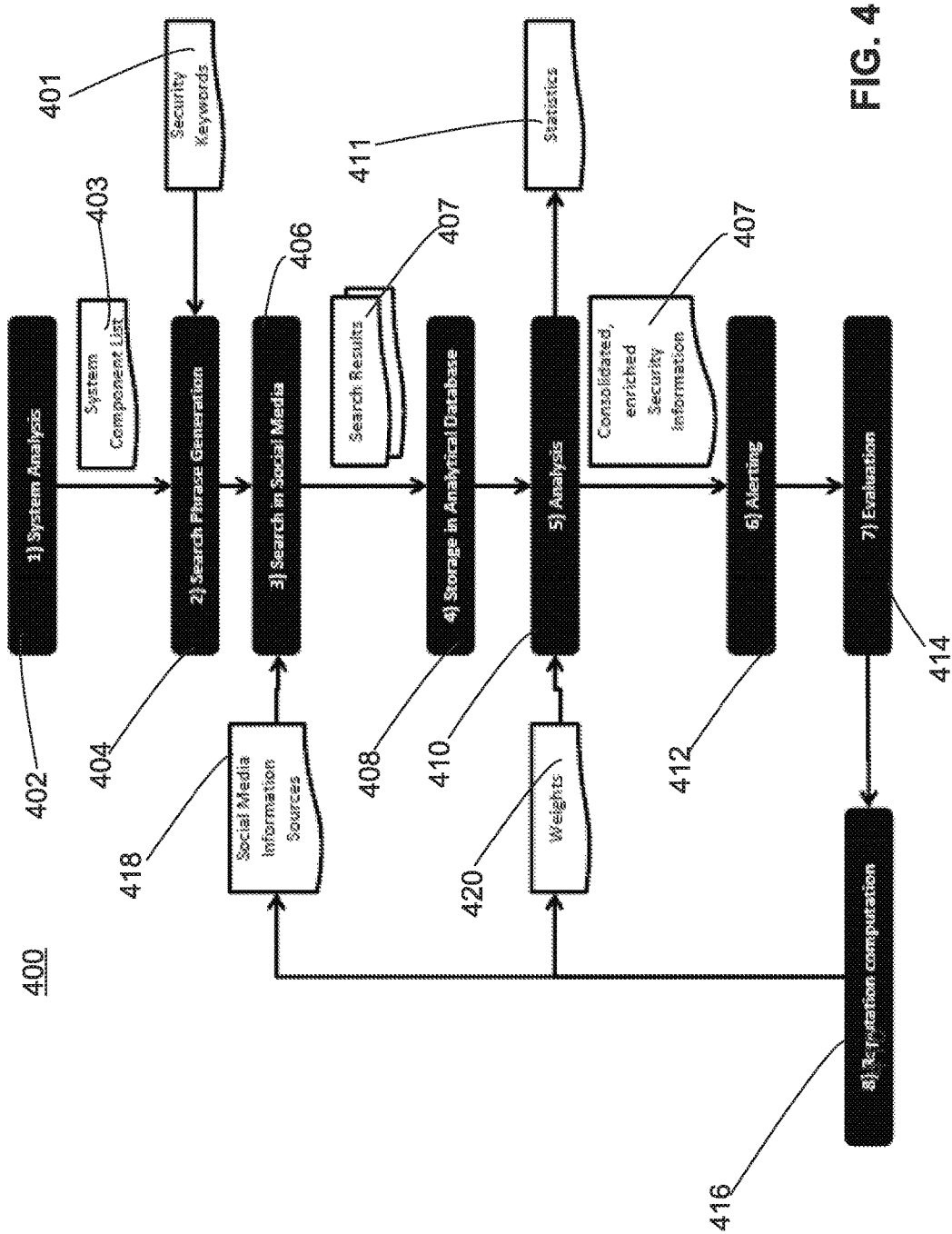
FIG. 4 illustrates a simplified view of an embodiment of a social media security information mining process.
Figure 5:
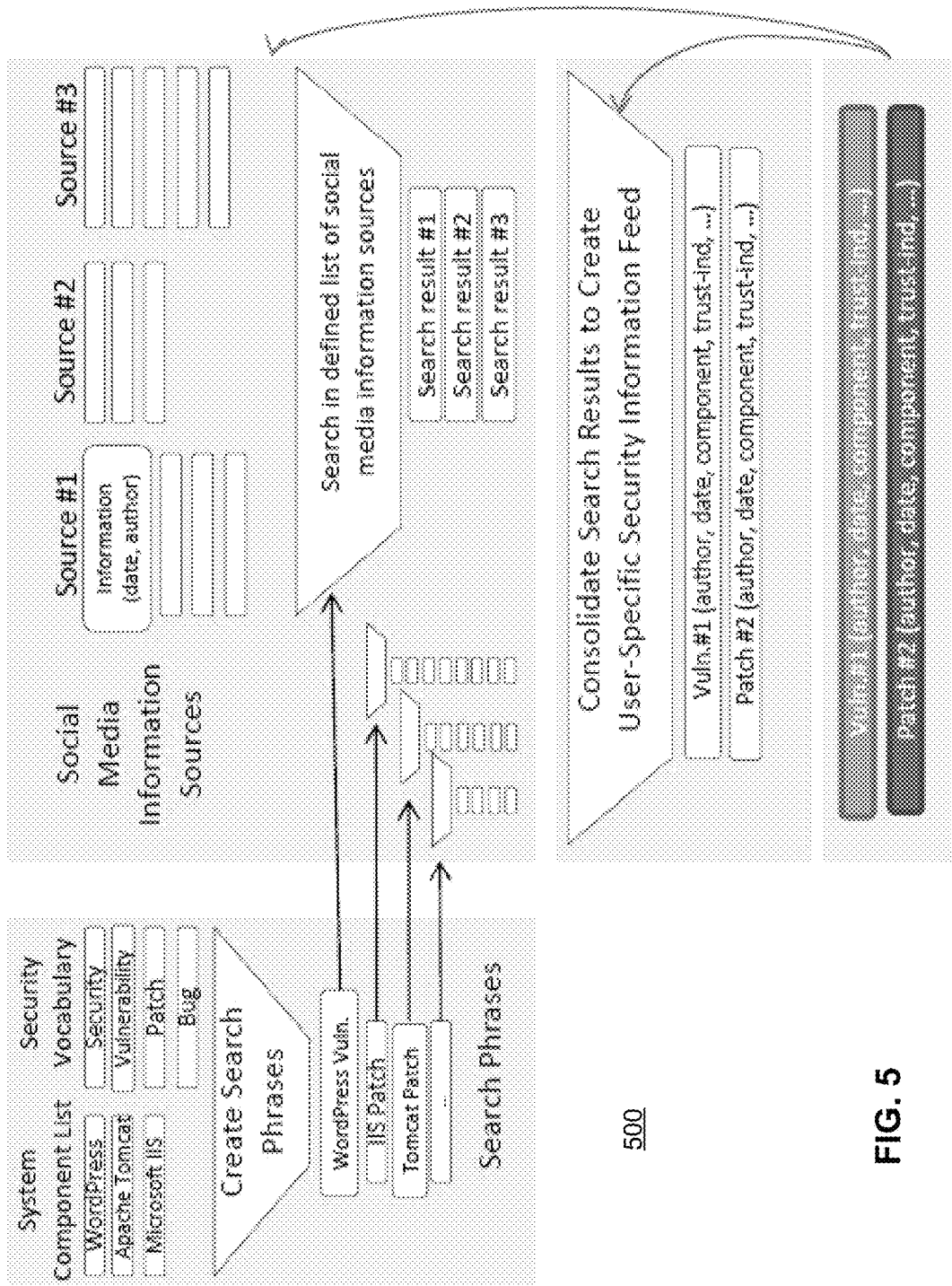
FIG. 5 is a simplified view showing information processing taking place along the embodiment of the process of FIG. 4.

Based upon security information received back from the various sources (and in particular from the informal source(s)), the engine is configured to communicate to the user outputs such as alerts 103 and/or other information relating to detected security issues. Further details regarding one possible system architecture according to a specific embodiment, are provided below in connection with FIG. 6. FIGS. 4-5 provide details regarding security information mining processes and the data being handled.

Utilizing embodiments, a window of opportunity can be reduced when relying upon informal information channels under at least the following two scenarios. A first scenario posits that fresh security information is initially published in informal channels.

As shown in FIG. 2, if it is assumed that a given customer only learns about a new vulnerability in stage 3 (by consulting an official or third party channel), the window of opportunity would span from the publication date in the informal channel until the publication date in the channel used by the respective end-user. Such a window of vulnerability could be entirely eliminated through the use of informal information channels to discover the security vulnerability as soon as it is available.

In an alternative scenario, even if fresh security information is first published in official or third party channels, it may be reflected (repeated) more quickly in informal channels than by other third party channels actually used by end-users. Thus in the example of FIG. 3, reference to informal channels of security information can still reduce (but not eliminate entirely) the window of opportunity.

One specific example provided later below illustrates the time gain that may be realized through the utilization of informal channels (e.g. WORDPRESS and TWITTER).

Besides gaining time, however, the use of informal channels according to embodiments as described herein may also permit the computation of metrics that go beyond technicalities. Such metrics are not available in official or third party channels One example of such a metric is the virality of security information (how fast and wide information spreads). This metric can be useful in assessing a risk associated to a given vulnerability.

Accordingly, particular embodiments describe methods and apparatuses that are configured to search and analyze fresh and relevant security information available in informal channels. The freshness of information supports end-users in securing their systems.

Embodiments of methods may comprise several steps related to:
  the creation of user-specific search phrases;
  the search for information in a set of social media information sources;
  the consolidation of search results;
  the alerting of and evaluation by users; and
  the refinement of the process.

One particular method and architecture of an information system according to an embodiment, is now described. FIG. 4 illustrates a simplified view of an embodiment of a social media security information mining process 400. FIG. 5 is a simplified view showing information processing taking place along the process of FIG. 4.

In particular, a first step 402 is system analysis. A list 401 of system components present in a given end user system is created, together with the respective version and other potentially relevant meta-data. Depending upon the particular embodiment, the list of system components can be coarse (e.g., including entire software applications), or be more fine-grained (e.g., including particular software libraries contained in composite applications).

Creation of the system component list may happen automatically. This can be achieved utilizing one or more of the following tools.

Configuration management systems (CMS) serve as a central inventory of so-called configuration items present in a customer system, one type of which are software applications. CMS typically support system maintenance tasks, e.g., change management or incident management.

Network and vulnerability scanners actively explore a given customer network. These tools produce a list of installed software applications.

Application scanners decompose software applications in order to identify software libraries being used. Using this information source may be motivated by the fact that today's applications are to a large extent composed of third party libraries, and vulnerabilities contained in one of them can render the entire application insecure.

In a second step 404 the system component list is used to create for each system component, multiple search phrases comprising security keywords 403. These may contain—in different combinations—system component names, component meta-data such as the version or vendor, and/or security specific vocabulary (security, vulnerability, hack, crack, threat, hole, etc.).

In a third step 406, each search phrase is used for searching content in social media information sources (e.g., blogs, security forums, single Twitter tags). A list of defined information sources may already exist, and moreover may be refined during the learning phase (step 416 below). The search results 407 (e.g., tweets, blog posts, forum responses) are collected, together with corresponding meta-data (author, date, likes, etc.). This search may be performed at regular intervals, or when new search phrases become available (e.g., because a new system component has been installed by the end-user).

In a fourth step 408, search results are then stored in an database. The database may be one providing string search and analysis features such as the Levenshtein Distance. An example of such a database is the HANA database available from SAP AG of Walldorf, Germany.

In a fifth step 410 the database may be continuously analyzed in order to identify, consolidate, and probe information. The consolidation may consider, in particular, referenced information (e.g., links in tweets), so as to determine whether search results coming from different sources are redundant. The analysis can consider, for instance, the trustworthiness of the author, and/or compute a virality factor. Where information is deemed relevant to a given user, it is provided in a security information feed.

Separately or in parallel, a more qualitative analysis of meta-data can be used to compute one or more metrics (statistics 411). These metrics can relate to vendors, products, and/or information sources. Examples can include the up-take by the security community (virality), and average patching time per component or vendor. Such macro analysis can produce valuable information concerning criticality of a software vulnerability on top of the factual, technical details, to produce consolidated and enriched security information 413.

In a sixth step 412, upon receiving new elements in the feed (i.e., whenever the process assumes), the corresponding administrator (or other user) is alerted by the software implementing the proposed process. Such an alert may take the form of email or some other form of communication (e.g., text, phone call, phone application alert, etc.)

In a seventh step 414 the administrator may validate the relevance of the respective information, and possibly other properties (e.g., quality or up-to-dateness). This evaluation can be used to optimize different steps of the above-described process. For example, the evaluation can be used to identify new social media information sources, to alter the search phrase generation, and/or to prioritize contributions of trusted authors during the consolidation process.

An eighth step 416 may involve reputation computation, with trusted sources being identified. This step may be used for the further refinement of the process and/or system. Thus if different information related to a specific component is positively evaluated by the administrator on multiple occasions, and the source of the alert is T times the same, this source can be considered valuable and added as new or more important information source during the search step 406 and/or analysis step 410. For example, a list of social media information sources 418 can be revised in the search step, and/or weights 420 can be assigned and considered during the analysis step.

Learning from the evaluations of the administrator can help to create a list of user feeds that are trusted and specialized to report vulnerabilities with specific components. In the same vein, information sources that repeatedly produce false-positives may be removed from the list of information sources. This learning phase can make the detection more precise and reduce false-positives.

Figure 6:
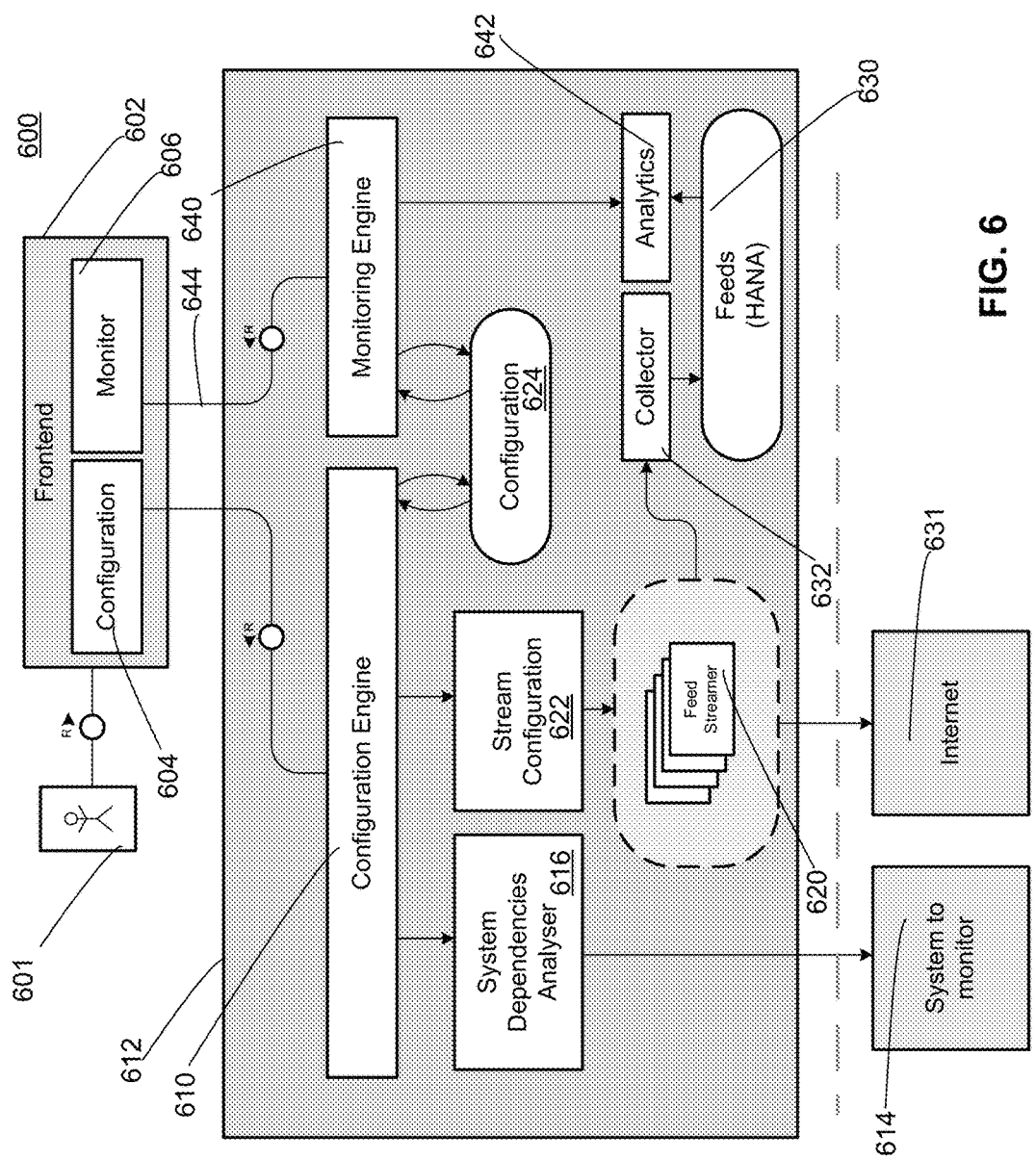
FIG. 6 shows a specific architecture of one system for mining security vulnerabilities according to an embodiment.

FIG. 6 shows a specific architecture of one system 600 according to an embodiment. A user 601 is in communication with a frontend 602 which comprises the configuration interface 604 and the monitoring interface 606.

The configuration interface on the frontend is in communication with a configuration engine 610 on the backend 612. The configuration engine is configured to commence analysis of the target system 614 to monitor via the dependencies analyzer. 616.

The configuration engine allows a human check on the result of the analysis. The configuration engine deploys as many feed streamers 620 as appropriate for the stream type and search criteria. The feed streamers are instantiated and configured by the stream configuration 622.

The configuration engine stores the configuration 624. This configuration can include dependencies analysis, associated search criteria, and stream(s) information.

The feed streamers reach out to the internet 631 and send their information in the feeds database (DB) 630 via the collector 632. In this particular example, the database is indicated as being the SAP HANA database, but this is not required in all embodiments.

The monitoring interface 606 of the frontend is in communication with the monitoring engine 640 of the backend. This monitoring engine starts some analytics 642 based on the configuration information and the feeds content. The monitoring engine sends alerts 644 to the user monitor.

The monitoring engine further provides to the user the possibility to evaluate the relevance of an alert. When a source is identified as trusted or relevant, the monitoring engine adds information for the stream source to be used for the analytics.

In combination with searching informal sources such as social media, embodiments may also reference formal official and third party sources of security information. The use of RSS mechanisms may be useful in this regard. Information obtained from official and third party sources may be used in the analysis of informal results, for example for validation and/or reputation assessment.

Example

Figure 7:
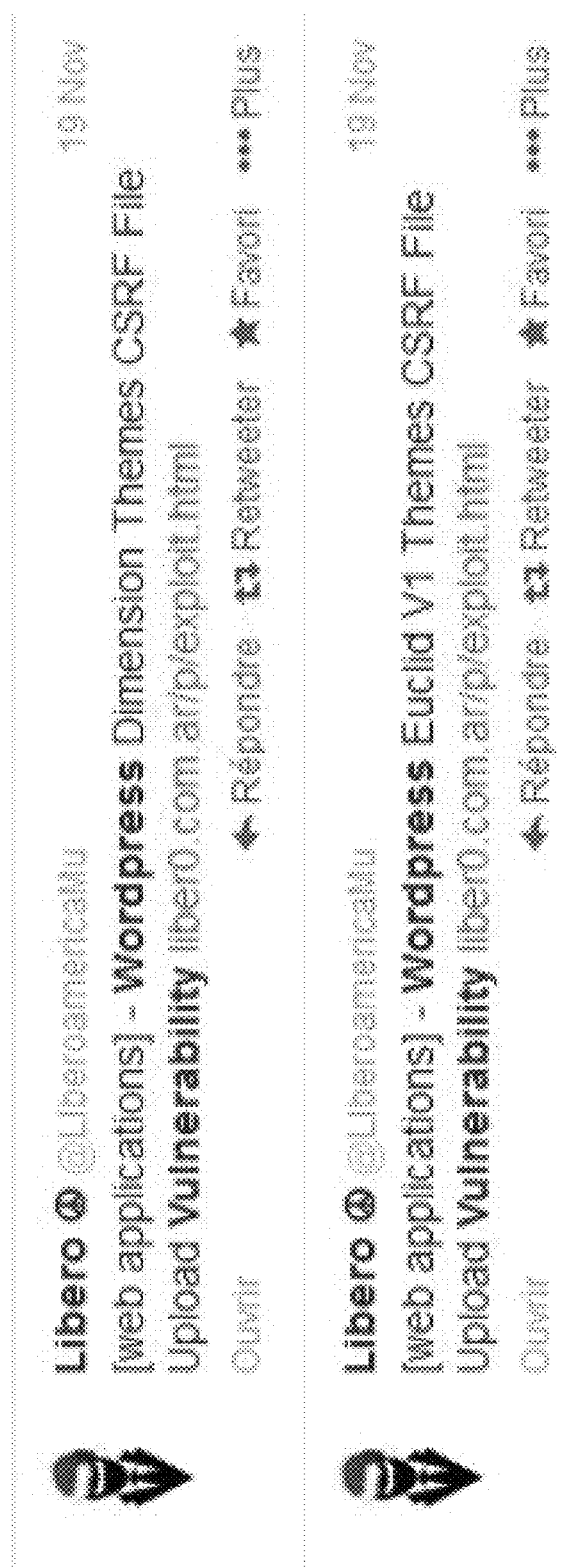
FIG. 7 illustrates initial reporting of security vulnerability through an informal channel type.

In the following example, fresh security information is first published in informal channels, for example as has been previously described above in connection with FIG. 2. Here on November 19, via an informal channel first traces of a vulnerability in a WORDPRESS module (namely the OptimizePress Theme File Upload module) were reported in TWITTER. This is shown in FIG. 7.

Ten days later, on November 29 the same vulnerability was reported via a third party channel (the website rapid7.com). On November 30, a vulnerability was reported via an official channel (WORDPRESS officially reported a vulnerability).

In this example the window of opportunity for exploiting the vulnerability in systems whose users rely only on the official channel, lasted eleven days. Corresponding attacks against some WORDPRESS websites were reported on November 21.

Figure 8:
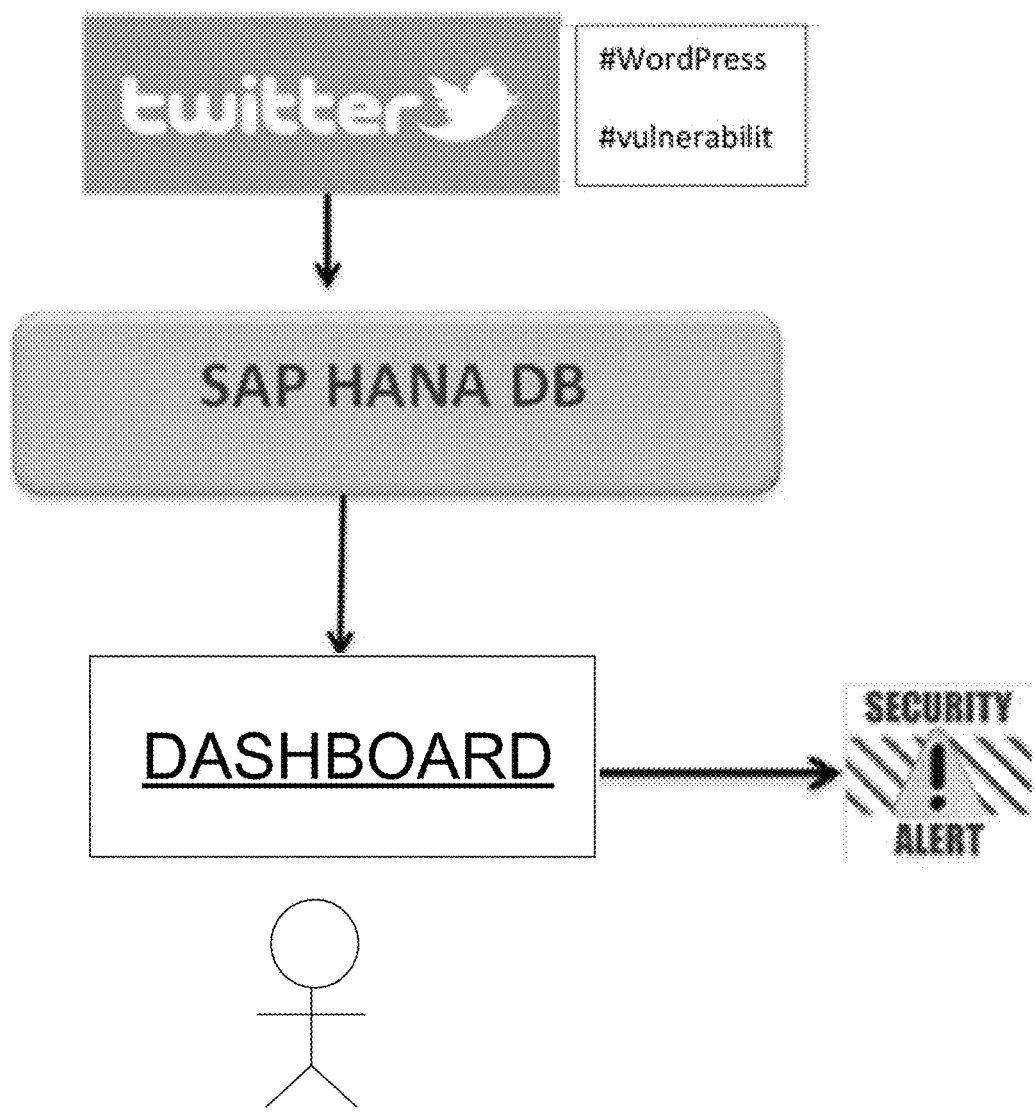
FIG. 8 is a simplified view of an example of vulnerability detection according to an embodiment.

FIG. 8 is a simplified view showing this example of vulnerability detection. The search phrase used in the case of FIG. 8 includes the terms "#WordPress" and "#Vulnerability". Relevance can be judged by identifying modules being in use in a given WORDPRESS installation.

FIG. 8 also shows a dashboard by which a user can interact with the security information. Examples of security information which can be displayed on the dashboard may include but are not limited to vulnerability details, exploit details, official disclosure details, patch details, response times, official statements, attack virality details, alert details, source details, generated metrics, and others. This information may be displayed on the dashboard in a variety of formats, for example charts, plots, message boards, maps, timelines, etc., depending upon the particular embodiment(s).

Systems and methods of data mining for identifying security vulnerability according to various embodiments, may offer certain benefits. For example, some embodiments may allow detection of the publication of security vulnerabilities across multiple platforms of different social networks. This can provide a degree of redundancy and expanded coverage.

Embodiments may allow the system administrator to be alerted about such vulnerabilities, in order to allow protective action to be taken. Embodiments may also allow alerts to be sent when the vulnerability is officially reported, and when a path is formally released.

Embodiments may be cost-effective since informal channels can be typically accessed free of charge. In addition, an identification of the relevance of security information sources can reduce manual processing time for discovering false-positives.

Figure 9:
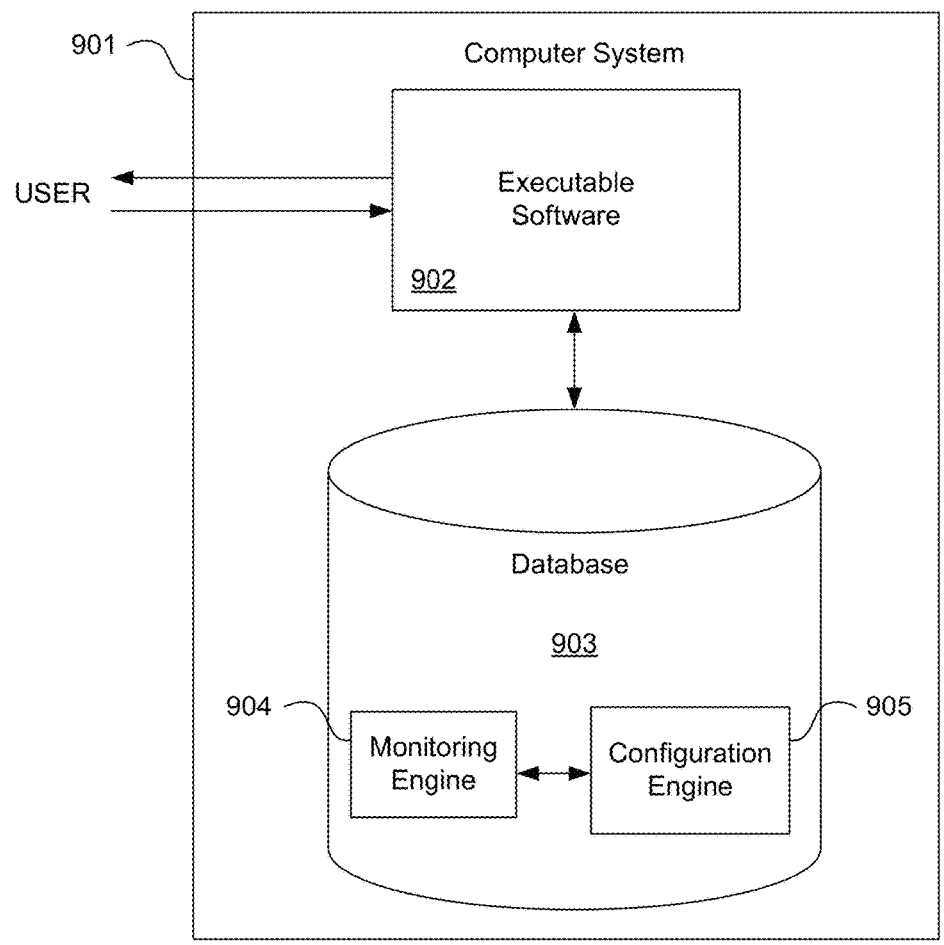
FIG. 9 illustrates hardware of a special purpose computing machine configured to perform data mining to identify security vulnerabilities according to an embodiment.

FIG. 9 illustrates hardware of a special purpose computing machine configured to mine security vulnerabilities from social media according to an embodiment. In particular, computer system 900 comprises a processor 902 that is in electronic communication with a non-transitory computer-readable storage medium 903. This computer-readable storage medium has stored thereon code 905 corresponding to a configuration engine. Code 904 corresponds to a monitoring engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 10:
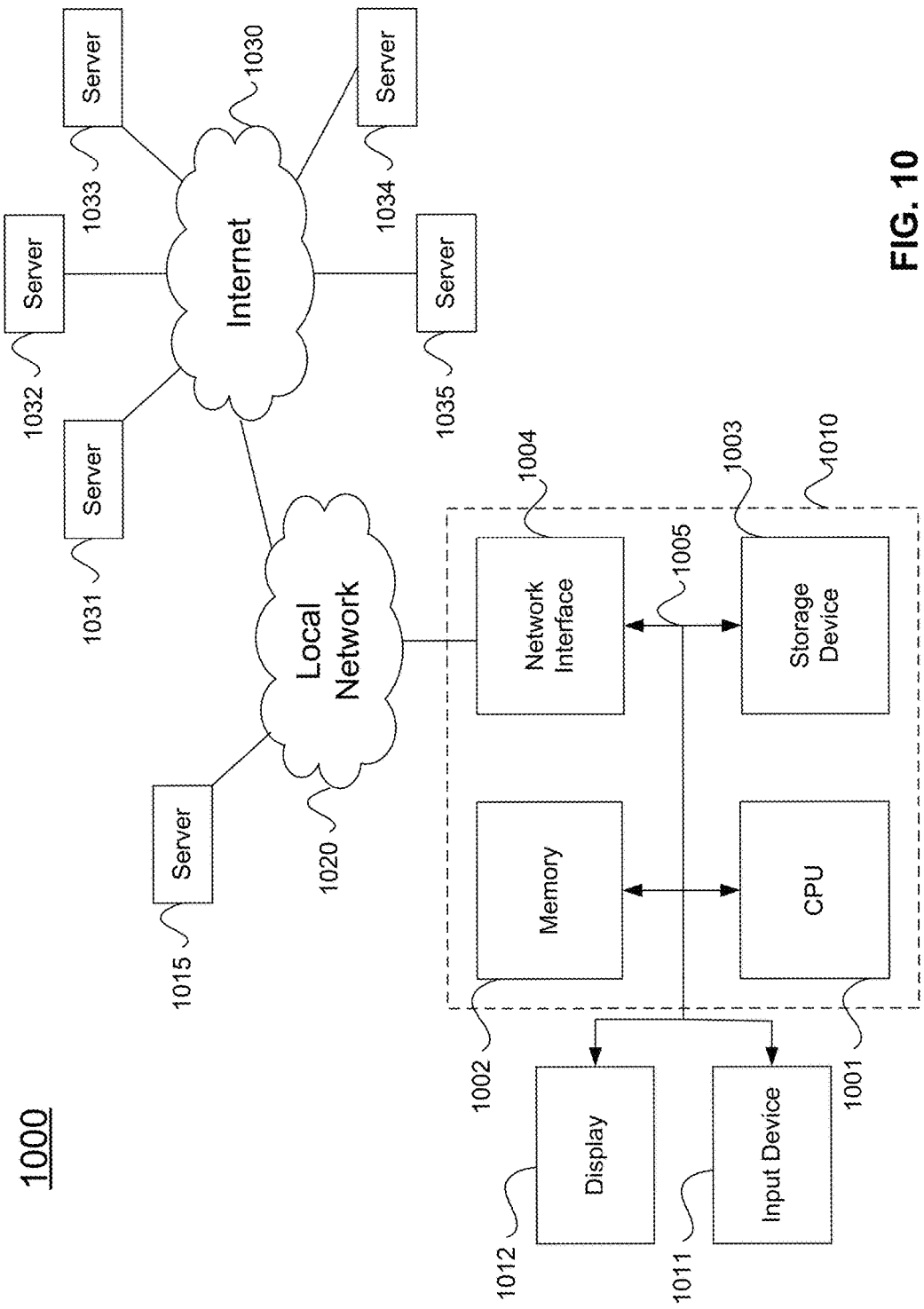
FIG. 10 illustrates an example of a computer system.

An example computer system 1010 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electro-magnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system 1010 may communicate with a plurality of other computer machines, such as server 1015. Accordingly, computer system 1010 and server computer systems represented by server 1015 may form a cloud computing network, which may be programmed with processes described herein. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

The above description illustrates various embodiments along with examples of how certain aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   causing an in-memory database configuration engine to store in an in-memory database, a list of system components;
   causing the in-memory database configuration engine to create and store in the in-memory database, a first security search phrase for each system component;
   causing the in-memory database configuration engine to search content in a social media information source with the first security search phrase to collect a first search result according to a stream configuration;
   causing the in-memory database configuration engine to store the first search result comprising a feed in the in-memory database with corresponding first meta-data, wherein stream information is stored by the in-memory database configuration engine;
   causing an in-memory database monitoring engine to perform an analysis of the first search result;
   based upon the analysis, causing the in-memory database monitoring engine to provide the first search result to a user;
   causing the in-memory database engine to compute a refined reputation of the social media information source, the refined reputation comprising an accuracy and a freshness;
   causing the in-memory database to change in a subsequent searching step producing a second search result, an importance of the social media information source based upon the refined reputation;
   causing the in-memory database configuration engine to store the second search result in the in-memory database with corresponding second meta-data;

causing the in-memory database to change in a subsequent analysis step of the second search result, a weight afforded the social media information source based upon an assessment of the refined reputation, the assessment referencing an official source of security information;

causing the in-memory database to compute from the weight and the second metadata, a metric selected from at least one of a virality and an average patching time; and based upon the subsequent analysis, causing the in-memory database monitoring engine to provide the second search result to the user.

2. A method as in claim 1 wherein the analysis comprises analyzing the first meta-data to compute a metric enriching the first search result.

3. A method as in claim 1 wherein the analysis comprises validating the first search result.

4. A method as in claim 1 further comprising:
causing the in-memory database configuration engine to create an updated list of system components;
causing the in-memory database configuration engine to create and store in the in-memory database, a second security search phrase for a new component of the updated list;
causing the in-memory database configuration engine to search content in a social media information source with the second security search phrase to collect a third search result;
causing the in-memory database configuration engine to store the third search result in the in-memory database with corresponding third meta-data;
causing the in-memory database monitoring engine to analyze the third search result;
based upon the analysis, causing the in-memory database monitoring engine to provide the third search result to the user.

5. A method as in claim 1 wherein:
the list of system components includes a software library; and
the first security search phrase relates to the software library.

6. A non-transitory computer readable storage medium embodying a computer program for performing a method, said method comprising:
causing an in-memory database configuration engine to store in an in-memory database, a list of system components;
causing the in-memory database configuration engine to create and store in the in-memory database, a first security search phrase for each system component;
causing the in-memory database configuration engine to search content in a social media information source with the first security search phrase to collect a first search result according to a stream configuration;
causing the in-memory database configuration engine to store the first search result comprising a feed in the in-memory database with corresponding first meta-data, wherein stream information is stored by the in-memory database configuration engine;
causing an in-memory database monitoring engine to perform an analysis of the first search result;
based upon the analysis, causing the in-memory database monitoring engine to provide the first search result to a user;

causing the in-memory database engine to compute a refined reputation of the social media information source, the refined reputation comprising an accuracy and a freshness;

causing the in-memory database to change in a subsequent searching step producing a second search result, an importance of the social media information source based upon the refined reputation;

causing the in-memory database configuration engine to store the second search result in the in-memory database with corresponding second meta-data;

causing the in-memory database to change in a subsequent analysis step of the second search result, a weight afforded the social media information source based upon an assessment of the refined reputation, the assessment referencing an official source of security information;

causing the in-memory database to compute from the weight and the second metadata, a metric selected from at least one of a virality and an average patching time; and based upon the subsequent analysis, causing the in-memory database monitoring engine to provide the second search result to the user.

7. A non-transitory computer readable storage medium as in claim 6 wherein the analysis comprises analyzing the first meta-data to compute a metric enriching the first search result.

8. A non-transitory computer readable storage medium as in claim 6 wherein the analysis comprises validating the first search.

9. A non-transitory computer readable storage medium as in claim 6 wherein the method further comprises:
causing the in-memory database configuration engine to create an updated list of system components;
causing the in-memory database configuration engine to create and store in the in-memory database, a second security search phrase for a new component of the updated list;
causing the in-memory database configuration engine to search content in a social media information source with the second security search phrase to collect a third search result;
causing the in-memory database configuration engine to store the third search result in the in-memory database with corresponding third meta-data;
causing the in-memory database monitoring engine to analyze the third search result; and
based upon the analysis, causing the in-memory database monitoring engine to provide the third search result to the user.

10. A non-transitory computer readable storage medium as in claim 6 wherein:
the list of system components includes a software library; and
the first security search phrase relates to the software library further comprising.

11. A computer system comprising:
one or more processors;
a software program, executable on said computer system, the software program configured to:
cause an in-memory database configuration engine to store in an in-memory database, a list of system components;
cause the in-memory database configuration engine to create and store in the in-memory database, a first security search phrase for each system component;

cause the in-memory database configuration engine to search content in a social media information source with the first security search phrase to collect a first search result according to a stream configuration;

cause the in-memory database configuration engine to store the first search result comprising a feed in the in-memory database with corresponding first meta-data, wherein stream information is stored by the in-memory database configuration engine;

cause an in-memory database monitoring engine to perform an analysis of the first search result;

based upon the analysis, cause the in-memory database monitoring engine to provide the first search result to a user;

cause the in-memory database engine compute a refined reputation of the social media information source, the refined reputation comprising an accuracy and a freshness;

cause the in-memory database to change in a subsequent searching step producing a second search result, an importance of the social media information source based upon the refined reputation;

cause the in-memory database configuration engine to store the second search result in the in-memory database with corresponding second meta-data;

cause the in-memory database to change in a subsequent analysis step of the second search result, a weight afforded the social media information source based upon an assessment of the refined reputation, the assessment referencing an official source of security information;

cause the in-memory database to compute from the weight and the second metadata, a metric selected from at least one of a virality and an average patching time;

based upon the subsequent analysis, cause the in-memory database monitoring engine to provide the second search result to the user.

12. A computer system as in claim 11 wherein the analysis comprises analyzing the first meta-data to compute a metric enriching the first search result.

13. A computer system as in claim 11 wherein the analysis comprises validating the first search result.

14. A computer system as in claim 11 wherein the software program is further configured to:
cause the in-memory database configuration engine to create an updated list of system components;
cause the in-memory database configuration engine to create and store in the in-memory database, a second security search phrase for a new component of the updated list;
cause the in-memory database configuration engine to search content in a social media information source with the second security search phrase to collect a third search result;
cause the in-memory database configuration engine to store the third search result in the in-memory database with corresponding third meta-data;
cause the in-memory database monitoring engine to analyze the third search result; and
based upon the analysis, causing the in-memory database monitoring engine to provide the third search result to the user.

* * * * *